(12) United States Patent
White (10) Patent No.: US 11,533,896 B1
(45) Date of Patent: Dec. 27, 2022

(54) INSECT TRAP LID FOR BUCKETS

(71) Applicant: Jesse Jonah White, Hardin, IL (US)

(72) Inventor: Jesse Jonah White, Hardin, IL (US)

( * ) Notice: Subject to any disclaimer, the term of this patent is extended or adjusted under 35 U.S.C. 154(b) by 0 days.

(21) Appl. No.: 17/409,142

(22) Filed: Aug. 23, 2021

(51) Int. Cl.
*A01M 1/10* (2006.01)

(52) U.S. Cl.
CPC .................................. *A01M 1/106* (2013.01)

(58) Field of Classification Search
CPC ..... A01M 1/103; A01M 1/106; B65D 43/022; B65D 2543/0049; B65D 2543/00805; B65D 2543/00814; B65D 2543/00546
USPC .................................... 43/120–122; 220/800
See application file for complete search history.

(56) References Cited

U.S. PATENT DOCUMENTS

| | | | | |
|---|---|---|---|---|
| 544,183 | A * | 8/1895 | Marchese | 43/121 |
| 1,208,987 | A * | 12/1916 | Lacht | 43/121 |
| 1,361,348 | A * | 12/1920 | Pfisterer | A47J 36/06 |
| | | | | D7/391 |
| 1,364,949 | A * | 1/1921 | Niewinski | A01M 1/106 |
| | | | | 131/242 |
| 1,544,334 | A * | 6/1925 | Martin | A01M 1/106 |
| | | | | 43/119 |
| 1,667,876 | A * | 5/1928 | Steiner | A01M 1/106 |
| | | | | 66/82 R |
| 1,867,252 | A | 3/1931 | Crigler | |
| 2,086,188 | A * | 7/1937 | Punte | B65D 43/0218 |
| | | | | 220/800 |
| 2,106,880 | A * | 2/1938 | Toaz | B65D 43/022 |
| | | | | 215/233 |
| 2,345,408 | A * | 3/1944 | Martin | A01M 1/103 |
| | | | | 43/107 |
| 2,721,595 | A * | 10/1955 | Nichols | B65D 43/0218 |
| | | | | 215/354 |
| 2,997,806 | A * | 8/1961 | Duvall | A01M 1/103 |
| | | | | 43/121 |
| 3,157,304 | A | 11/1964 | Judge | |

(Continued)

FOREIGN PATENT DOCUMENTS

| | | | | |
|---|---|---|---|---|
| CN | 109051280 A | * | 12/2018 | B65D 43/0206 |
| DE | 3837786 A1 | * | 5/1989 | B65D 43/0208 |

(Continued)

OTHER PUBLICATIONS

Fruit Fly Trap [online]. Five Gallon Ideas, Jan. 13, 2021. Retrieved from the Internet: <URL: http://fivegallonideas.com/fruit-fly-trap/>.

*Primary Examiner* — Peter M Poon
*Assistant Examiner* — Morgan T Jordan
(74) *Attorney, Agent, or Firm* — Creativenture Law, LLC; Kevin C. Staed; Dennis J M Donahue, III (57) ABSTRACT

A lid that loosely connects to the rim of a bucket and converts the bucket into an effective insect trap. To allow the lid to move atop the bucket but remain attached thereto without creating an airtight seal, insets and tabs are provided along the outer and inner sidewalls of the groove in the rim and respectively engage the bucket rim. In operation, ventilation is provided between the rim of the bucket and groove of the lid which draws insects trapped therein towards the rim of the bucket and away from funnels in the top of the lid through which they insects may enter the container. However, the groove is sized such that the space between the sidewalls and land of the groove and the rim of the bucket is too small for an insect to escape.

20 Claims, 3 Drawing Sheets

(56) References Cited

U.S. PATENT DOCUMENTS

| | | | | |
|---|---|---|---|---|
| 3,282,463 A * | 11/1966 | Stuart | B65D 51/18 | 220/270 |
| 3,516,572 A * | 6/1970 | Paul | B65D 43/0212 | 220/784 |
| 3,566,946 A * | 3/1971 | MacDonald | B65D 43/0206 | 220/783 |
| 3,643,830 A * | 2/1972 | Kinney | B65D 1/265 | 220/785 |
| 3,651,981 A * | 3/1972 | Kinney | B65D 21/0233 | 220/785 |
| 3,655,089 A | 4/1972 | Tower | | |
| 3,666,088 A * | 5/1972 | Wingardh | B65D 43/022 | 206/508 |
| 3,672,536 A * | 6/1972 | Kinney | B65D 51/1666 | 220/785 |
| 3,883,036 A * | 5/1975 | Mahaffy | B65D 21/0219 | 220/781 |
| 3,885,341 A * | 5/1975 | Kuchenbecker | A01M 1/106 | 43/65 |
| 3,964,635 A * | 6/1976 | Ludder | B65D 43/0212 | 220/784 |
| 4,026,459 A * | 5/1977 | Blanchard | B65D 21/0219 | 220/792 |
| 4,397,404 A * | 8/1983 | Blanchette | B65D 43/0206 | 206/508 |
| 4,421,244 A * | 12/1983 | Van Melle | B65D 43/0212 | 206/508 |
| 4,487,329 A * | 12/1984 | Winstead | B29C 61/02 | 220/276 |
| 4,488,658 A * | 12/1984 | Smith | B65D 43/0289 | 220/276 |
| 4,642,936 A * | 2/1987 | Jobin | A01M 1/026 | 43/122 |
| 4,852,776 A | 8/1989 | Patton | | |
| 4,881,656 A * | 11/1989 | Chumley | B26F 1/22 | 215/256 |
| 4,899,485 A * | 2/1990 | Schneidmiller | A01M 1/04 | 43/107 |
| 4,908,977 A | 3/1990 | Foster | | |
| 4,934,558 A | 6/1990 | Vargas | | |
| 5,046,632 A * | 9/1991 | Bordner | B65D 21/022 | 220/276 |
| 5,274,949 A | 1/1994 | Beaton | | |
| 5,392,949 A * | 2/1995 | McKenna | B65D 47/0847 | 220/276 |
| 5,678,720 A | 10/1997 | Van Melle | | |
| 5,730,309 A * | 3/1998 | Jiradejnunt | A47J 47/18 | 215/354 |
| 6,015,061 A * | 1/2000 | Lowry | B65D 43/0218 | 220/780 |
| 6,112,452 A | 9/2000 | Campbell | | |
| 6,450,358 B1 | 9/2002 | Berro | | |
| 6,532,695 B1 * | 3/2003 | Alvarado | A01M 1/2016 | 43/107 |
| D477,223 S | 7/2003 | Smith et al. | | |
| 6,594,948 B1 * | 7/2003 | Novack | A01M 25/004 | 43/131 |
| 6,609,329 B2 | 8/2003 | McCallum | | |
| 6,637,149 B1 * | 10/2003 | Bauer | A01M 1/106 | 43/107 |
| 6,925,749 B2 | 8/2005 | Wong | | |
| 7,093,389 B1 | 8/2006 | Meier et al. | | |
| 7,222,453 B2 * | 5/2007 | Uhl | A01M 1/04 | 43/65 |
| 7,290,368 B2 | 11/2007 | Rich et al. | | |
| D573,017 S | 7/2008 | Henderson | | |
| 8,286,827 B2 | 10/2012 | Yacktman | | |
| 8,356,444 B2 * | 1/2013 | Pazik | A01M 1/02 | 43/107 |
| D780,992 S | 3/2017 | Lozier | | |
| D812,183 S | 3/2018 | McGavin et al. | | |
| D888,877 S | 6/2020 | White | | |
| 2004/0231229 A1 * | 11/2004 | Lenker | A01M 1/02 | 43/107 |
| 2005/0072039 A1 * | 4/2005 | Wong | A01M 1/103 | 43/121 |
| 2005/0160659 A1 * | 7/2005 | Forehand | A01M 1/106 | 43/107 |
| 2006/0042154 A1 * | 3/2006 | Rich | A01M 1/02 | 43/107 |
| 2009/0084805 A1 * | 4/2009 | Bryson | B65D 43/0208 | 220/790 |
| 2010/0127003 A1 * | 5/2010 | Alvares | B65D 43/021 | 220/669 |
| 2013/0087573 A1 * | 4/2013 | Noer | B65D 43/0231 | 220/788 |
| 2018/0229901 A1 | 8/2018 | Monica | | |
| 2019/0177046 A1 * | 6/2019 | Hoff | A01G 13/0243 | |
| 2019/0216075 A1 | 7/2019 | McGavin | | |
| 2019/0283938 A1 * | 9/2019 | Strachan | B65D 43/0208 | |
| 2020/0214278 A1 * | 7/2020 | Stoller | A01M 1/02 | |

FOREIGN PATENT DOCUMENTS

| | | | | |
|---|---|---|---|---|
| FR | 2580258 A | * | 10/1986 | B65D 43/021 |
| GB | 2294034 A | * | 4/1996 | A47J 47/18 |
| KR | 20130007257 U | * | 12/2013 | B65D 43/0256 |
| SE | 509365 C2 | * | 1/1999 | B65D 43/0212 |
| WO | WO-2015089235 A1 | * | 6/2015 | B65D 17/163 |

* cited by examiner

Fig. 1A

Section A-A

Fig. 1B

INSECT TRAP LID FOR BUCKETS

CROSS-REFERENCE TO RELATED APPLICATIONS

This application is an original US Non-Provisional Patent Application and makes no claim to an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to a lid for a bucket and more particularly to a lid that converts the bucket into an insect trap.

Related Art

Adaptable lids have long been used to convert containers into an insect trap given the desire for a cost effective and reusable means for trapping flies, bees, wasps and other similar flying insects which can become a significant nuisance. For example, an empty soda could readily be converted into an insect trap by using a lid on the rim of the can to allow insects, attracted to the leftover sugars within the can, to crawl through a small opening and become trapped within the container given that they cannot crawl back out through the opening that is positioned within or proximate to the container opening. Similarly, an empty ice cream pail or spare 5-gallon bucket with bait put therein could also be converted into an insect trap by attaching a lid that allows insects to crawl or fly through openings in the lid and which traps the insects therein without an easy method of escape. However, there remains a need in the art for an improved lid that can be used with larger containers, such as buckets, and to convert the larger container into an insect trap.

There have been previous solutions to convert larger containers into insect traps, such as US Pat. App. Pub. No. 2019/0216075 by McGavin, which teaches a bucket lid that connects to the top of a bucket and has a frustoconical opening protruding into the container. However, a problem exists with this invention given the lid itself seals with the top rim of the bucket and the only airflow in and out of the bucket is through the opening in the top of the lid that allows insects to enter the container. Accordingly, the effectiveness of the trap is reduced.

In another shortcoming of the McGavin bucket lid and other similar lids that produce a liquid or air tight seal when affixed to the top of a container, the lids cannot be readily used with buckets of the same volume produced by different manufacturers. For example, even though numerous sized buckets may be labeled as 5-gallon, the rim dimensions and design are not always uniform and the versatility of lids effecting an air tight seal is therefore limited. Thus, another issue exists in the McGavin design and similar lids which must be sized and shaped with sufficient structure to seal around the rim of a particular bucket and are rendered ineffective with other buckets that do not necessarily have a mating rim design. Without such structure, the lid cannot effectively snap onto the top of the bucket and the lid is thereby rendered ineffective.

Other previous solutions more suited for smaller containers like cups are described in U.S. Pat. No. 6,925,749 by Wong and U.S. Pat. No. D888,877 by White, which each teach lids that connect to the top of beverage containers and have a frustoconical opening protruding into the container. Both Wong and White describe lids that rely on an insect's inability to find or access the small opening through which they entered the container to keep the insects trapped therein. For example, in each invention the opening is significantly smaller than the opening of the container itself and is centered within the container so that it can only be reached by an insect that flies to the opening or climbs from the bottom of the container, up the sidewall and down the underside of the lid before it is able to escape. Alternatively, closing mechanisms and means for preventing insects from finding and escaping through the opening, such as a flap that can close the opening or a sticky substance within the container itself that traps the insect, these elements require additional items of manufacture or modification of the container itself. Furthermore, these additional trapping means cannot be readily controlled by the user and there subsequently remains a need for an improved lid that can be easily closed by the user and subsequently opened again without requiring additional mechanical features or external substances.

Another prior art reference, U.S. Pat. No. D780,992 by Lozier, describes an ashtray for a can that integrates similar principles of the insect trap lids described above but is particularly suited for use with a can. In particular, the Lozier invention is an adapter that releasably connects to the top of a can rim and has a frustoconical opening positioned above the can opening that allows ashes to be disposed into the can. Although similar in principle, the Lozier invention is incapable of functioning as a usable insect trap given the size and dimension of the frustoconical opening positioned over the opening of the container. In operation, the ashtray adapter functions to facilitate the passage of ashes from the topside of the ashtray and into the container and thereby requires a bottom opening in the smallest embodiment that is sized and shaped to approximately match the opening of the container on which it sits. Given the requirement for a proportionality sized bottom opening that allow ashes to enter the can, using the Lozier invention as a lid to convert the can into an insect trap would provide no benefit over simply trying to trap insects within the can without a lid because the size of the opening would not be reduced.

Furthermore, the ashtray in Lozier particularly requires a top opening in the frustoconical passage from the top of the ashtray to the can opening that is aligned with the center of the ashtray itself. In operation, the center set top opening catches ash that may be deposited into the ashtray from any point around the perimeter of the ashtray. Further, the top ring of the ashtray surrounding the top opening is angled downwards to assure that all ashes deposited into the tray funnel into the container.

While the size and dimensions of the opening could vary relative to the container opening, the fundamental principle of operation of the Lozier invention requires that the opening be as large as permitted by the opening of the container to facilitate the easiest passage of ashes from the lid into the can. Thus, the bottom end of the frustoconical opening proximate to the opening of the can could not be reduced to a size that would effectively prevent insects from exiting the container itself and thereby would not allow the Lozier invention to operate as an effective insect trap without necessarily changing its principle of operation.

There are also cup lids that are known to fit on different sized containers with some having a single tier with multiple concentric grooves that form different sized lips in the relatively flat lid while others having a multi-tier configuration with stepped lips. U.S. Pat. No. 5,678,720 by Van Melle and WIPO PCT Pub. No. 200706560 by D'Amato particularly describe lids having tiered sidewalls that can be used with cups and cans of varying sizes. However, a problem exists in these designs given each tier within the sidewall necessarily requires a concave shape to securely clamp around the rim of the container. The concave portion of the sidewall is effective at affixing the lid to the container and provides a water-tight seal between the lid's sidewall and the cup's rim. To provide a water-tight seal, these lids are used with lids that have a rim diameter and thickness that can effectively nest within the concave tier. Furthermore, these designs require more complex and costly molds which inherently make them less desirable than an alternative multi-tier design that is less complex and expensive to produce, not limited by rim thickness and is universal across most, if not all, can and container designs.

In addition to the shortcomings discussed above, another problem exists in products in the prior art that include a sloped sidewall but which do not necessarily provide a water-tight seal, such as shown in US Design Pat. D888,877. Although this lid and similar designs can be loosely placed on the top of a container and effectively convert a container into an insect trap, the lid is secured by a frictional fit with a canted outwardly sidewall of the lid contacting a round rim of the container. When loosely placed on the container so there is no water-tight seal with the rim of the container, the canted sidewall does not have a firm friction fit and can be easily dislodged and thereby allow the insects to escape. If the user pushes down on the lid to effect a strong friction fit, a water-tight seal could be created between the canted sidewall and the rim of the container wherein the canted outwardly sidewall effectively functions as a concave recess which grips the rim of the container in a similar manner to designs having a concave section described above. In such an instance, no ventilation is provided around the rim of the container and insects are less likely to be attracted to the container because the aroma is only escaping through the openings in the top of the lid.

Accordingly, there remains a need for a lid that can convert an ice cream pail, bucket or similar container into an insect trap which does not require rigid structural supports to affix the lid to the container. Further, there is also a desire for the lid to allow for air passage around the rim of the container while preventing insects who may enter the container from escaping around the rim.

SUMMARY OF THE INVENTION

The invention described herein is a lid that connects to the rim of a bucket, such as an ice cream pail or 5-gallon bucket, for converting the bucket can into an effective insect trap. The lid includes a top disk and an annular groove along the perimeter of the disk with a series of insets and tabs for securing the lid to the bucket without creating a water or air tight seal. The lid also includes at least one funnel on the top disk that allows insects, such as a fly, to enter the bucket and remain trapped therein.

The lid is attached to the top of a bucket with the funnel positioned over the bucket opening. Subsequently, an insect may crawl or fly from the surrounding space into the funnel and enter the bucket, thereby becoming trapped therein. The bottom opening of the funnel is sized to be smaller than the top opening to reduce the likelihood that an insect may crawl or fly back out of the bottom opening and escape from the trap.

In another aspect of the lid, the groove that receives the rim of the bucket can raise and lower without being dislodged from the bucket such that no air or water tight seal is provided between the lid and the bucket. To allow the lid to move atop the bucket but remain secured thereto, tabs and insets are respectively provided along the inner and outer sidewall of the groove and respectively engage portions of the bucket rim. In operation, ventilation is provided between the rim of the bucket and groove of the lid which draws insects trapped therein towards the rim of the bucket and away from the funnels through which they entered. However, the groove is sized such that the space between the sidewalls and land of the groove and the rim of the bucket is too small for an insect to escape.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The lid 10 described herein connects to the rim 105 of a container 100, such as a 1-gallon ice cream pail, 5-gallon bucket, or 10-gallon bucket, and converts the container into an effective insect trap. In operation, the periphery of the lid is loosely attached to the rim of the container with funnels in top of the lid positioned over the opening 110 on the topside of the container such that insects can may crawl or fly from the surrounding space into the funnels and enter the container through the opening situated beneath the funnels and thereby become trapped therein. Furthermore, the non-airtight and non-watertight 18 loose-fitting lid and funnels in the top of the lid allow scent from bait that may be held within the container to escape around the periphery of the lid as well as through the openings in the funnels and collectively increase the effectiveness of the trap.

The lid includes a top disk 12 having an upper surface 36, a lower surface 38 and an outer perimeter 40 which are substantially situated within a first horizontal plane 26. To connect the lid to the bucket rim, an annular groove 16 is provided around the outer perimeter of the disk and the rim of the bucket is seated within the groove when the lid is attached thereto in the seated position 52 as best shown in the detail views of FIGS. 2B and 2C. Conversely, the rim of the bucket is removed from the annular groove and the lid can be detached from the bucket to access the contents within the container. The disk and groove of the lid in the preferred embodiment are circumferential in shape but may have an alternative form that match the shape of the container on which the lid is intended to be used. For example, the lid may be a rectangular shape and still operate according to the invention described herein.

To allow insects to enter the container through the lid, at least one funnel is provided in the disk. The funnel 14 includes a top opening 44a within the disk and a tapered sidewall 42 extending a funnel sidewall length ($L_F$) to the bottom opening 44b situated beneath the top opening and the disk within a lower horizontal plane 28. The funnel includes a frustoconical shape with the top opening having a diameter ($D_{TO}$) that is larger than the diameter of the bottom opening ($D_B$), i.e., $D_B < D_{TO}$. Although the particular diameters of the funnel openings will vary relative to the size of lid and container on which it is intended to be used, the diameter of the bottom opening is less than one half the diameter of the top opening ($D_B < \frac{1}{2} D_{TO}$) and is preferably less than one-third the diameter of the top opening ($D_B < \frac{1}{3} D_{TO}$). Accordingly, an insect can readily enter the funnel through the larger top opening and follow the sidewall through the bottom opening before being trapped in the container.

The top openings of the funnels within the disk are preferably affixed to the disk within the first horizontal plane. Furthermore, the bottom openings of the funnels further comprise a funnel flange 74 that outwardly extends a funnel flange length ($L_{ff}$) from the bottom opening to a distal edge 76 within the lower horizontal plane. Although it will be appreciated that the lid described herein may function without a funnel flange and the funnel may terminate at the bottom opening without additional structure, the funnel flange further narrows the diameter of the bottom opening to reduce the chances that an insect may escape while also providing additional structural support to the lid. As further explained herein, the lid is intended to be made from a lightweight plastic material and the funnel flange thereby provides skeletal structure at the bottom opening of the funnel to prevent unwanted bending or flexing.

Figure 1A:
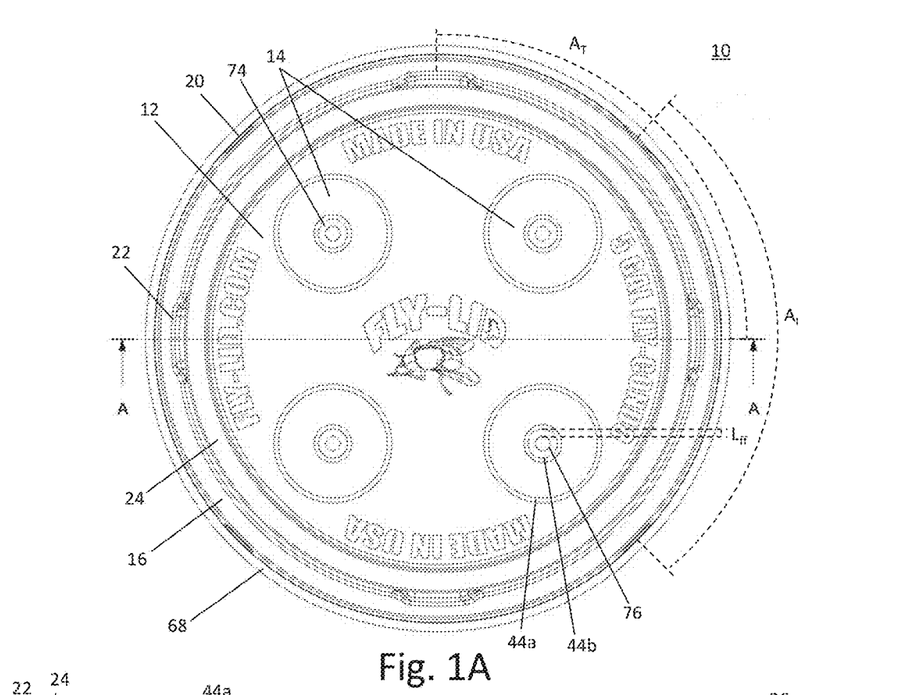
FIG. 1A is a top view of the lid according to the invention described herein.
Figure 1B:
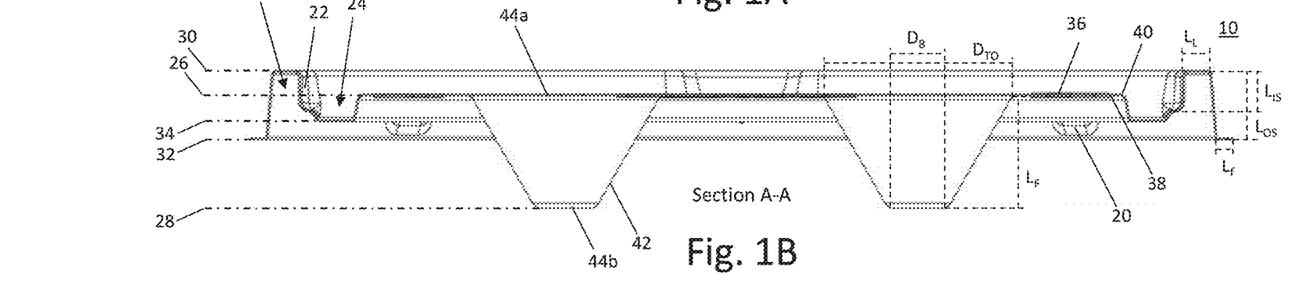
FIG. 1B is a side view of the lid according to the invention described herein.

The annular groove is a collar which loosely receives the rim of the container when the lid is attached to the bucket. The groove includes an inner sidewall 46 and an outer sidewall 48 that are connected on opposing ends 50a, 50b of a land 50 at their respective top edges 46a, 48a and radially spaced by the land length ($L_L$). The bottom edge 46b of the inner sidewall connects around the outer perimeter of the disk and is spaced from the top edge by the inner sidewall length ($L_{IS}$). Similarly, the bottom edge 48b of the outer sidewall is spaced from the top edge of the outer sidewall by the outer sidewall length ($L_{OS}$) which is greater than the inner sidewall length ($L_{OS} > L_{IS}$). Accordingly, the land is positioned within an upper horizontal plane 30 above the first horizontal plane and the bottom edges of the respective inner and outer sidewalls are beneath the upper horizontal plan as shown in FIG. 1B. Although the bottom edge of the outer sidewall may be positioned in another plane 32 beneath the medial plane discussed below, it will be appreciated that the medial plane could be aligned with the other plane and the bottom trough of the channel can be within the same plane as the bottom edge of the outer sidewall. In operation, the rim of the bucket is received within the groove between the inner and outer sidewalls and engages the underside 64 of the land in the seated position. However, to allow for sufficient ventilation along the outer periphery of the lid and container, the seated position is devoid of a watertight or airtight seal.

Furthermore, to allow the lid to be quickly and easily attached to the rim of the container, the outer sidewall of the groove cants outwardly from the top edge to the bottom edge such that the space between the bottom edges of the groove is greater than the land at the top edge of the groove, preventing the bottom edge of the sidewall from snapping underneath the rim of the bucket. The groove is thereby intentionally oversized and does not match the shape or dimension of the rim that it receives yet the inner and outer edges of the rim respectively remain proximal to the exterior and interior of the inner and outer sidewalls so air may escape while trapping insects therein. In contrast to traditional bucket lids that are designed to fit a specific bucket and provide a water-tight or fairly secure connection so that a bucket can be transported or stored without its contents being spilled or lost, the lid described herein loosely fits atop the bucket and can thereby be used with many different bucket types that have various rim geometries and dimensions.

In another aspect of the lid described herein, the annular groove loosely holds the lid atop the bucket and the lid can thereby move between a fully engaged position 52a and a partially engaged position 52b while continuously being in the seated position. In the fully engaged position, the entire periphery of the land 58 contacts the rim of the bucket whereas at least a portion of the land 60 is not in contact with the rim in the partially engaged position. In the fully engaged position illustrated in FIG. 3A, the topside of the rim 62 is in contact with the underside of the land that is within the upper horizontal plane and the topside of the rim is therefore proximate to the upper horizontal plane in the fully engaged position. Conversely, a portion of the topside of the rim 66 is removed from the underside of the land within the upper horizontal plane and spaced a distance therefrom (D) in the partially engaged position as shown in FIG. 3B. Thus, the lid can freely move between the fully engaged position and the partially engaged position while remaining in the seated position atop the bucket.

Although the lid may move atop the bucket as described above, sets of insets 20 and tabs 22 within the annular groove loosely hold the lid in the seated position and thereby prevent the lid from being unintentionally dislodged. The insets radially protrude inwardly a distance ($D_I$) into the groove from an interior surface 54 of the outer sidewall towards the inner sidewall and contact the outer edge of the rim. Conversely, the tabs radially protrude outwardly a distance ($D_T$) into the groove from an exterior surface 56 of the inner sidewall towards the outer sidewall. Thus, at least one of the insets and tabs contact the rim of the bucket in the seated position while simultaneously acting as a standoff to prevent the groove from forming a water-tight seal with the rim of the container. For example, a seal could be created if either of the inner or outer sidewalls of the groove flushly abut the rim of the bucket and the tabs and insets therefore prevent a seal from being created by spacing at least a portion of the respective sidewalls from the rim regardless of whether the lid is fully or partially engaged with the rim as described herein. Furthermore, the sidewalls of the groove do not have any particular contours or shaping to fit the curvature of the bucket rim that may create an unwanted seal.

Although the particular dimensions of the land, insets and tabs may vary relative to the bucket on which the lid is intended to be used, it will be appreciated that both the distance of the insets and the distance of the tabs are less than the length of the land. ($D_I$, $D_T$<$L_L$). Furthermore, it is preferred that a combination of the inset distance and the tab distance is also less than the land length ($D_I$+$D_T$<$L_L$) with each of the inset distance and the tab distance being less than one-half of the land length. ($D_I$, $D_T$<½ $L_L$). As shown in FIG. 1A, each of the insets and tabs are offset from one another around the perimeter of the disk with the insets being spaced an arc length ($A_I$) around the interior surface of the outer sidewall and the tabs being spaced an arc length ($A_T$) around the exterior surface of the inner sidewall.

Figure 2A:
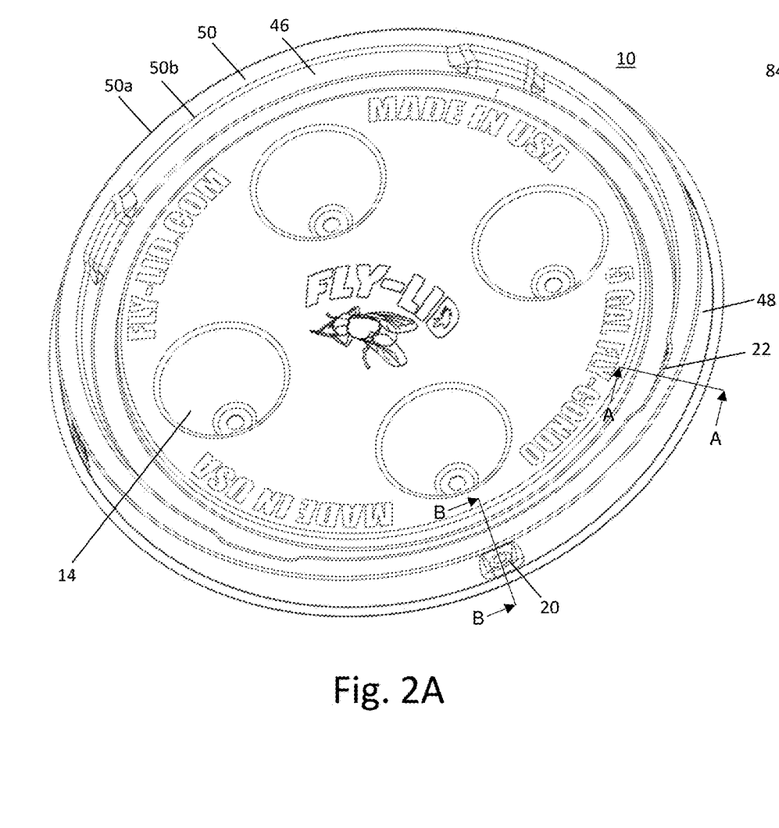
FIG. 2A is a raised perspective view of the lid according to the invention described herein.
Figure 2B:
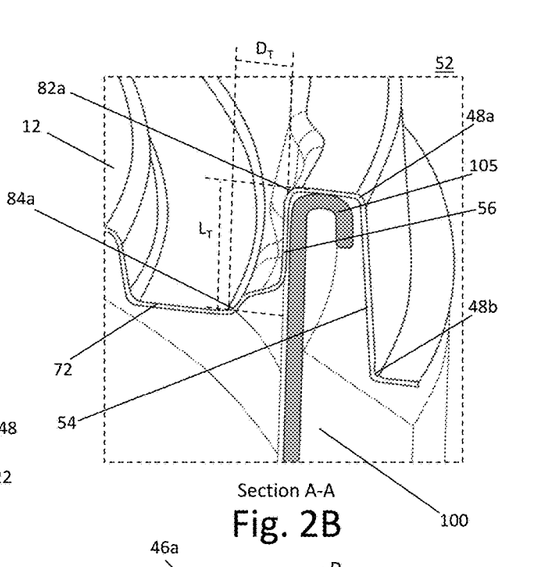
FIGS. 2B and 2C are perspective cross-sectional views of the lid according to the invention described herein.
Figure 2C:
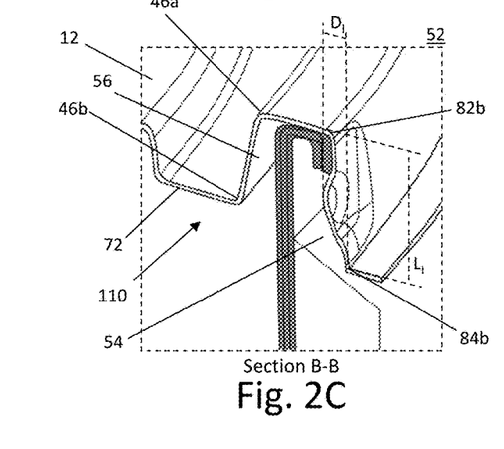

Furthermore, as respectively shown in the detail views of 2B and 2C, the protruding distance of the insets and tabs may be irregular along the respective lengths ($L_T$, $L_I$) between respective top end 82a, 82b and bottom ends 84a, 84b. In addition, the lengths of the insets and tabs may not necessarily equal the lengths of the corresponding sidewalls from which they protrude.

A flange 68 may also be provided on the bottom edge of the outer sidewall which radially protrudes a flange length ($L_f$) from the bottom edge of the outer sidewall to the distal edge 70 within the lower horizontal plane. In operation, the flange provides an additional gripping surface to allow the user to detach the lid from the container as well as allows for wind to catch the underside of the lid and move the lid between the partially and full engaged position. To prevent too much air from catching the underside of the flange, it is preferred that the flange length is less than the land length. ($L_f$<$L_L$). Although the tabs and insets hold the lid atop the bucket, movement is preferred such that insects may be directed to the outer perimeter of the container as airflows therethrough. However, because the space between the loose-fitting groove and rim is not large enough to allow the insects to escape, they remain trapped in the container.

To allow for greater ventilation out of the container, vent apertures may be provided in the disk to allow additional ventilation and airflow into the container aside from the single opening in the bottom of the funnel. The vent openings are preferably slits positioned proximate to the perimeter of the disk but may take any other shape or form provided that they are not so large that they could allow an insect to escape.

Figure 3A:
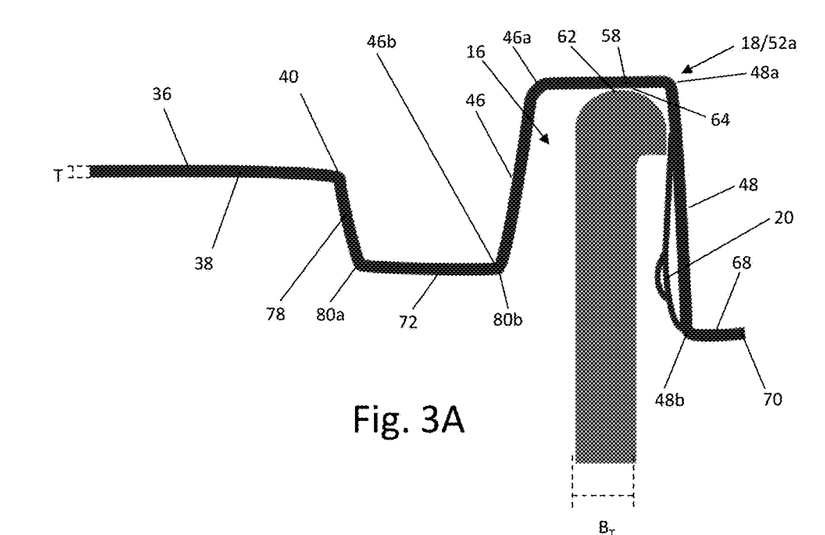
FIGS. 3A and 3B are detail cross-sectional views of the lid in the engaged orientation according to the invention described herein.
Figure 3B:
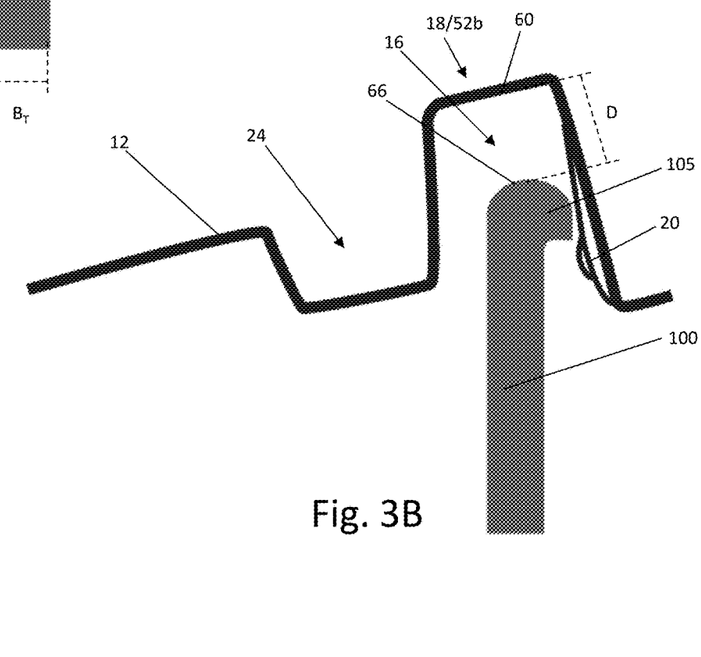

In an alternative embodiment of the lid described herein and particularly shown in shown in FIGS. 1B and 3A, a channel 24 may be provided between the inner sidewall of the groove and the outer perimeter of the disk. The channel includes a bottom trough 72 within a medial horizontal plane 34 that is below the first horizontal plane and above the lower horizontal plane. Furthermore, an interior sidewall 78 extends downwardly from the outer perimeter of the disk to an inner edge 80a of the trough and the bottom edge of the inner sidewall connects to the outer edge 80b of the trough.

In another aspect of the lid described herein, the lid is made from a lightweight plastic material having a uniform thickness (T) that is significantly less than the length of the land, being less than one-quarter the land's length (T<¼ $L_L$), and is even less than the inset distance (T<$D_I$). Standard bucket lids have approximately the same thickness as the bucket container's sidewalls and base ($B_T$) of which would be greater than the inset distance ($B_T$>$D_I$) so the standard lids can support the weight of filled buckets that are stacked on top of each other. Since the lid for the present invention is specifically for catching insects and is not structural like standard bucket lids, the thickness of the lid according to the present invention is preferably less than ½ the standard thickness of the bucket container's sidewall thickness (T<½ $B_T$). Accordingly, the material of the lid does not provide structural support to the bucket or seal the bucket as described with many of the lids in the prior art. Instead, the lightweight and loose-fitting lid is intended to move between the partial and fully engaged positions so that ventilation is increased. Similarly, the material from which the lid is made is preferably a clear plastic that allows a user to see any insects that may have entered the container so that they may take extra care when releasing or otherwise disposing of the insects within the trap.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lid, comprising:
    a bucket comprising a rim;
    a disk comprising an upper surface, a lower surface, and an outer perimeter, wherein the disk is substantially situated within a first horizontal plane;
    a funnel comprising a tapered sidewall extending from a top opening in the first horizontal plane to a bottom opening in a lower horizontal plane below the first horizontal plane, wherein the top opening comprises a first diameter within the outer perimeter of the disk, wherein the bottom opening comprises a second diameter that is less than one half the first diameter, and wherein the bottom opening is spaced a first distance beneath the first horizontal plane;
    an annular groove connected to the disk around the outer perimeter, wherein the annular groove comprises an inner sidewall, an outer sidewall and a land, wherein each of the inner sidewall and the outer sidewall comprise a top edge and a bottom edge respectively spaced by an inner sidewall length and an outer sidewall length, wherein the land radially extends a land length between an inner edge connected to the top edge of the inner sidewall and an outer edge connected to the top edge of the outer sidewall, wherein the rim of the bucket engages the land in a seated position, and wherein the seated position is devoid of a water-tight seal between the annular groove and the rim;
    a set of insets situated within the annular groove and radially protruding inward a second distance from an interior surface of the outer sidewall towards the inner sidewall, and wherein the second distance that is less than the land length; and
    a set of tabs situated within the annular groove and radially protruding outward a third distance from an exterior surface of the inner sidewall towards the outer sidewall, wherein the third distance is less than the land length, wherein at least one of the insets and the tabs contact the rim of the bucket in the seated position, and wherein the insets and the tabs prevent the annular groove from forming the water-tight seal with the rim.

2. The lid of claim 1, wherein the insets and the tabs loosely hold the lid in the seated position and allow the lid to move between a fully engaged position in which an entire periphery of the land contacts the rim and a partially engaged position in which at least a portion of the land is not in contact with the rim.

3. The lid of claim 2, wherein the land is situated in an upper horizontal plane above the first horizontal plane, wherein a topside of the rim is substantially situated within the upper horizontal plane and contacts an underside of the land in the fully engaged position, wherein a portion of the topside of the rim is spaced a fourth distance from the underside of the land and removed from the upper horizontal plane in the partially engaged position, and wherein the rim freely moves between the fully engaged position and the partially engaged position while remaining in the seated position.

4. The lid of claim 1, wherein a combination of the second distance and the third distance is less than the land length, and wherein each of the second distance and the third distance are less than one half the land length.

5. The lid of claim 1, wherein the outer sidewall cants outwardly from the top edge connected around the outer edge of the land to the bottom edge.

6. The lid of claim 1, wherein each of the insets and the tabs are offset and respectively spaced an arc length from one another around the interior surface of the outer sidewall and the exterior surface of the inner sidewall.

7. The lid of claim 1, wherein the inner sidewall length is less than the outer sidewall length.

8. The lid of claim 1, wherein the bottom edge of the outer sidewall is further comprised of a flange outwardly extending a flange length to a distal edge, wherein the flange is situated in the lower horizontal plane, and wherein the flange length is less than the land length.

9. The lid of claim 1, further comprising a channel connecting the inner sidewall of the groove to the outer perimeter of the disk, wherein the channel has a bottom trough situated in a medial horizontal plane below the first horizontal plane and above the lower horizontal plane.

10. The lid of claim 1 further consisting of a plastic material having a thickness, and wherein the thickness is less than the second distance of the insets.

11. The lid of claim 1, wherein the first distance is greater than the inner sidewall length and the outer sidewall length.

12. The lid of claim 1, wherein the funnel is fixedly attached within the outer perimeter of the disk around the top opening, and wherein the bottom opening is further comprised of a funnel flange outwardly extending a funnel flange length to a funnel flange distal edge, and wherein the funnel flange is situated in the lower horizontal plane.

13. A lid, comprising:
a bucket comprising a rim;
a disk comprising an upper surface, a lower surface, and an outer perimeter, wherein the disk is substantially situated within a first horizontal plane;
a plurality of funnels each comprising a tapered sidewall extending from a top opening fixedly connected to the disk in the first horizontal plane to a bottom opening in a lower horizontal plane below the first horizontal plane, wherein the top opening comprises a first diameter within the outer perimeter of the disk, wherein the bottom opening comprises a second diameter that is less than one half the first diameter and a funnel flange outwardly extending a funnel flange length from the bottom opening within the lower horizontal plane, and wherein the bottom opening is spaced a first distance beneath the first horizontal plane;
an annular groove connected to the disk around the outer perimeter, wherein the annular groove comprises an inner sidewall, an outer sidewall and a land, wherein each of the inner sidewall and the outer sidewall comprise a top edge and a bottom edge respectively spaced by an inner sidewall length and an outer sidewall length, wherein the land radially extends a land length between an inner edge connected to the top edge of the inner sidewall and an outer edge connected to the top edge of the outer sidewall, wherein the rim of the bucket engages the land in a seated position, and wherein the seated position is devoid of a water-tight seal between the annular groove and the rim;
a set of insets situated within the annular groove and radially protruding inward a second distance from an interior surface of the outer sidewall towards the inner sidewall, wherein the second distance is less than half of the land length; and
a set of tabs situated within the annular groove and radially protruding outward a third distance from an exterior surface of the inner sidewall towards the outer sidewall, wherein a combination of the second distance and the third distance is less than the land length, wherein at least one of the insets and the tabs contact the rim of the bucket in the seated position, and wherein the insets and the tabs prevent the annular groove from forming the water-tight seal with the rim.

14. The lid of claim 13, wherein the insets and the tabs loosely hold the lid in the seated position and allow the lid to move between a fully engaged position in which an entire periphery of the land contacts the rim and a partially engaged position in which at least a portion of the land is not in contact with the rim, wherein the land is situated in an upper horizontal plane above the first horizontal plane, wherein a topside of the rim is substantially situated within the upper horizontal plane and contacts an underside of the land in the fully engaged position, wherein a portion of the topside of the rim is spaced a fourth distance from the underside of the land and removed from the upper horizontal plane in the partially engaged position, and wherein the rim freely moves between the fully engaged position and the partially engaged position while remaining in the seated position.

15. The lid of claim 13 further consisting of a plastic material having a thickness, a flange, and a channel connecting the inner sidewall of the groove to the outer perimeter of the disk, wherein the thickness is less than the second distance of the insets, wherein the flange outwardly extends a flange length from the bottom opening to a distal edge within the lower horizontal plane, wherein the flange length is less than the land length, and wherein the channel has a bottom trough situated in a medial horizontal plane below the first horizontal plane and above the lower horizontal plane.

16. The lid of claim 13, wherein each of the insets and the tabs are offset and respectively spaced an arc length from one another around the interior surface of the outer sidewall and the exterior surface of the inner sidewall, wherein the third distance is less than half the land length, wherein the inner sidewall length is less than the outer sidewall length, and wherein the outer sidewall cants outwardly from the top edge connected around the outer edge of the land to the bottom edge.

17. A lid, comprising:
a bucket comprising a rim;
a disk comprising an upper surface, a lower surface, and an outer perimeter, wherein the disk is substantially situated within a first horizontal plane;
a plurality of funnels each comprising a tapered sidewall extending from a top opening fixedly connected to the disk in the first horizontal plane to a bottom opening in a lower horizontal plane below the first horizontal plane, wherein the top opening comprises a first diameter within the outer perimeter of the disk, wherein the bottom opening comprises a second diameter that is less than one half the first diameter and a funnel flange outwardly extending a funnel flange length from the bottom opening within the lower horizontal plane, and wherein the bottom opening is spaced a first distance beneath the first horizontal plane;
an annular groove connected to the disk around the outer perimeter, wherein the annular groove comprises an inner sidewall, an outer sidewall and a land, wherein each of the inner sidewall and the outer sidewall comprise a top edge and a bottom edge respectively spaced by an inner sidewall length and an outer sidewall length, wherein the bottom edge of the outer sidewall is further comprised of a flange outwardly extending a flange length to a distal edge, wherein the flange is situated in the lower horizontal plane, wherein the land radially extends a land length between an inner edge connected to the top edge of the inner sidewall and an outer edge connected to the top edge of the outer sidewall, wherein the flange length is less than the land length, wherein the rim of the bucket engages the land in a seated position, and wherein the seated position is devoid of a water-tight seal between the annular groove and the rim;
a set of insets situated within the annular groove and radially protruding inward a second distance from an interior surface of the outer sidewall towards the inner sidewall;
a set of tabs situated within the annular groove and radially protruding outward a third distance from an exterior surface of the inner sidewall towards the outer sidewall, wherein each of the second distance and the third distance are less than half the land length, wherein at least one of the insets and the tabs contact the rim of the bucket in the seated position, and wherein the insets and the tabs prevent the annular groove from forming the water-tight seal with the rim; and
a plastic material having a thickness, and wherein the thickness is less than the second distance of the insets.

18. The lid of claim 17, wherein the insets and the tabs loosely hold the lid in the seated position and allow the lid to move between a fully engaged position in which an entire periphery of the land contacts the rim and a partially engaged position in which at least a portion of the land is not in contact with the rim, wherein the land is situated in an upper horizontal plane above the first horizontal plane, wherein a topside of the rim is substantially situated within the upper horizontal plane and contacts an underside of the land in the fully engaged position, wherein a portion of the topside of the rim is spaced a fourth distance from the underside of the land and removed from the upper horizontal plane in the partially engaged position, and wherein the rim freely moves between the fully engaged position and the partially engaged position while remaining in the seated position.

19. The lid of claim 17, wherein each of the insets and the tabs are offset and respectively spaced an arc length from one another around the interior surface of the outer sidewall and the exterior surface of the inner sidewall, wherein each of the second distance and the third distance are less than one half the land length, wherein the inner sidewall length is less than the outer sidewall length, and wherein the outer sidewall cants outwardly from the top edge connected around the outer edge of the land to the bottom edge.

20. The lid of claim 17, further comprising a channel connecting the inner sidewall of the groove to the outer perimeter of the disk, wherein the channel has a bottom trough situated in a medial horizontal plane below the first horizontal plane and above the lower horizontal plane.

* * * * *